United States Patent [19]

Sekerich

[11] 4,145,093
[45] Mar. 20, 1979

[54] BALL BEARING ROLLER ASSEMBLY

[75] Inventor: Michael Sekerich, Spring Valley, N.Y.

[73] Assignee: Buildex, Inc., West Nyack, N.Y.

[21] Appl. No.: 864,530

[22] Filed: Dec. 27, 1977

[51] Int. Cl.² .................. F16C 29/04; F16C 33/00
[52] U.S. Cl. ............................... 308/3.8; 308/190; 308/195
[58] Field of Search ............ 308/3.8, 16, 18, 182, 308/190, 191, 193, 195; 29/148.4 A; 312/341 R; 301/5.7; 16/98, 106, 107

[56] References Cited

U.S. PATENT DOCUMENTS

| 2,977,162 | 3/1961 | Brooks | 308/193 |
| 3,317,986 | 5/1967 | Sutowski | 308/195 |
| 3,454,314 | 7/1969 | Sanguinetti | 308/191 |
| 3,824,658 | 7/1974 | Donahue et al. | 308/190 |
| 4,006,945 | 2/1977 | Sekerich | 308/3.8 |

FOREIGN PATENT DOCUMENTS 2339773  8/1977  France .................... 308/195

Primary Examiner—Charles E. Frankfort
Attorney, Agent, or Firm—Howard C. Miskin

[57] ABSTRACT

A ball bearing roller assembly for extensible draw tracks and the like includes a plastic roller having a bore with an annular race terminating at its rear end in a resilient releasable retainer lip and at proximate its forward end in a peripheral inside flange. A steel core coaxially registers with the roller and has a cylindrical outer race terminating at its forward end in a converging arcuate face and a coaxial stub projects rearwardly from the core. Bearing balls are entrapped between the races are impeded from forward movement and releasably restricted from rear movement by the resilient lip. A mounting plate includes a centrally apertured raised circular section abutting the core rear face with the stub engaging the aperture and being upset to lock the assembly and lock the balls against rearward release.

6 Claims, 2 Drawing Figures

BALL BEARING ROLLER ASSEMBLY

BACKGROUND OF THE INVENTION

The present invention relates generally to improvements in ball bearing devices and it relates more particularly to an improved ball bearing supported assembly highly useful in extensible track structures for supporting drawers and the like.

Freely rotatable rollers are employed in many applications and where a minimum of resistance is desired, the rollers are generally ball bearing supported. Such ball bearing supported rollers are widely used in the slide coupling of extensible tracks used for drawers and the like, and to this end the roller assembly is mounted on a bracket plate which, in turn, is mounted on the associated structure. Heretofore, the ball bearing supported roller unit is a self contained locked assembly independent of the mounting thereof and as such possesses drawbacks and disadvantages. It is an expensive device as a consequence of the relatively high cost of fabrication due to the steps required for effecting the locked assembly of the unit and otherwise leaves much to be desired.

SUMMARY OF THE INVENTION

It is accordingly a principal object of the present invention to provide an improved bearing device.

Another object of the present invention is to provide an improved ball bearing supported roller device.

Still another object of the present invention is to provide an improved bracket mounted ball bearing supported roller assembly highly useful in extensible track devices for drawers and the like.

A further object of the present invention is to provide an improved structure of the above nature characterized in its low cost, ruggedness, simplicity, reliability and high versatility and adaptability.

The above and other objects of the present invention will become apparent from a reading of the following description taken in conjunction with the accompanying drawings which illustrate a preferred embodiment thereof.

In a sense the present invention contemplates the provision of an improved ball bearing roller assembly comprising an inner core member having an inner race defining circular outer peripheral face, an outer roller member in coaxial registry with the core member and having an outer race defining circular inner peripheral face spaced from the core member outer peripheral face and defining therewith a ball bearing housing annular space, a plurality of ball bearings disposed in the annular space and entrapped between the raceways, the annular space having a front annular throat of relatively small width less than the diameter of a ball bearing to lock the ball bearings against forward longitudinal movement and a rear throat of relatively greater width less than the diameter of a ball bearing to releasably retain the ball bearings in the annular space and a support plate having a raised circular section coaxial with and joined to the core member and at least partially covering the rear throat to lock the ball bearings against longitudinal movement through the rear throat.

In accordance with a preferred embodiment of the present invention the core member is formed of metal and is provided with a rearwardly directed deformable coupling stub and an annular rear face and the core peripheral face includes a cylindrical rear section and an arcuate concave forward section terminating in a front stepped portion. The roller is formed of a recoverably compressible or resilient plastic and projects shortly rearwardly of the core member rear annular space and has an arcuate concave inner peripheral face terminating proximate its rear in a convex curved inwardly directed lip delineating with the confronting core peripheral face a slightly restricted throat permitting the snap passage of a ball bearing under longitudinal pressure by slightly compressing the lip. The plate raised circular portion engages the core rear face and has a central opening through which the coupling stub projects and has its end upset to tightly engage the border of the opening.

The improved ball bearing roller assembly is simple, rugged, reliable and of low cost and easy to fabricate, and is of great versatility and adaptability.

DESCRIPTION OF THE PREFERRED EMBODIMENT

Figures 1, 2:
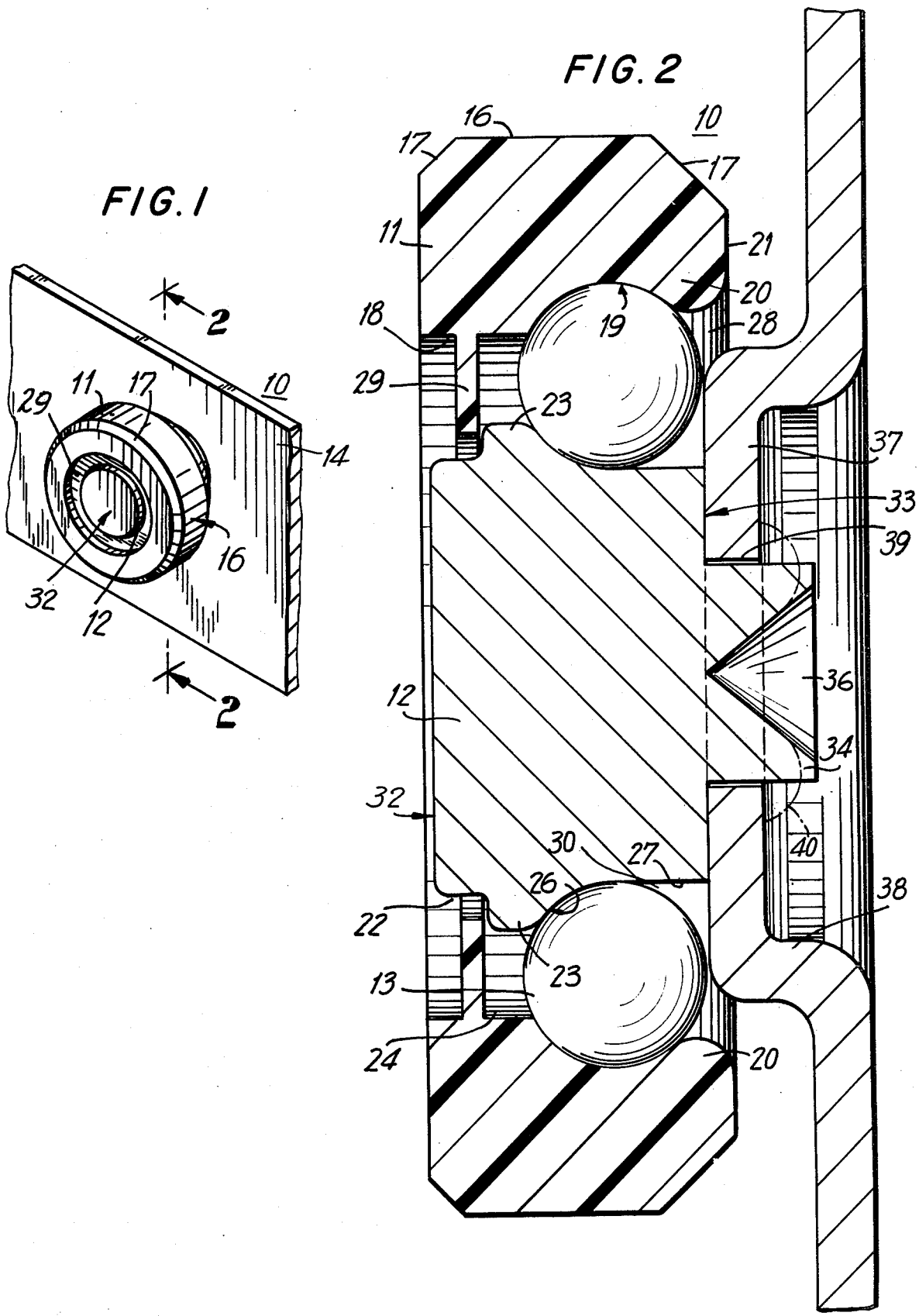
FIG. 1 is a fragmented perspective view of a ball bearing roller assembly embodying the present invention.
FIG. 2 is an enlarged sectional view taken along line 2—2 in FIG. 1, the assembly being shown by solid line in an unlocked condition and by broken line in locked condition.

Referring now to the drawings which illustrate a preferred embodiment of the invention, the reference numeral 10 generally designates the improved ball bearing assembly which includes a roller 11, an axial core member 12, a plurality or set of bearing balls 13 and a support plate 14.

The roller 11 is of annular configuration and is advantageously formed of a recoverably compressible or resilient synthetic organic polymeric resin of high wear and abrasion resistance such as nylon or the like. The outer peripheral face 16 of roller 11 is cylindrical and bevelled at its end edges as at 17. The forward inside peripheral face 18 is cylindrical and an inwardly directed planar annular flange 19 is formed on inside peripheral face 18 between the front and rear edges thereof. Formed in the roller inside peripheral face directly rearwardly of and joining the cylindrical inside face is an outer race defining groove 19 of arcuate transverse cross-section of approximately the diameter of a bearing ball 13. The arcuate groove 19 terminates at its rear end in a radially inwardly directed rounded peripheral lip or convexity 20 which, at its rear, joins the planar annular rear face 21 of roller 11.

The axle or core member 12 is formed of steel or other suitable metal and is coaxial with and surrounded by roller 17 and is provided along its front edge with an annular step 22 with which the flange 29 registers. Directly rearwardly of the annular step 22 is an outwardly directed peripheral section 23 projecting toward the roller inside peripheral face 18 rearward of the flange 29 and defines therewith an annular throat 24 of much less width than the diameter of a bearing ball 13 to prevent or lock the bearing balls 13 against forward longitudinal movement. The peripheral face of core member 12 rearward of throat 24 includes a concave arcuate intermediate section 26 of about the diameter of a ball 13 and a cylindrical rear section 27 tangent to the face intermediate section 26, the core peripheral face 26 defining an inner race. The confronting faces of core section 27 and lip 20 delineate an annular throat 28 of slightly less opening width than the diameter of a ball 13 to releasably retain the balls 13 in the annular space 30 delineated by the confronting inner and outer races. That is, a ball 13 with the application of a longitudinal pressure thereto may traverse the throat 28 by effecting a deformation or compression of the lip 20 to expand the corresponding area of the opening of throat 28 and permit the passage of the ball and otherwise the ball is retained in the space 30.

The front and rear faces 32 and 33 respectively of the main body of core member 12 are planar and disposed inwardly of the front and rear faces of roller 11. Integrally formed with and projecting coaxially rearwardly of core member 12 is a cylindrical fastening or coupling stub 34 having a coaxial conical recess 36 initially formed in its outer face to permit the upsetting thereof.

The support plate 14 may constitute or may form part of a bracket, or other device or component and is advantageously stamped of metal and includes a desirably located raised circular portion 37 preferably parallel to plate 14 and joined thereto by an integrally formed cylindrical wall 38. The diameter of raised circular portion 37 is about equal to, or somewhat larger than the diameter of the circular medial path between the inner and outer races. A circular coupling opening 39 of about the diameter of stub 34 is formed in raised circular portion 37.

In the assembled condition of the roller device 10 a plurality or set of bearing balls 13 are disposed in the annular space 30 and couple the roller 11 and core member 12 for free relative rotation. The stub 34 engages the opening 39 with the front face of the plate raised portion 37 abutting and projecting radially beyond the core member rear face 33, the outer periphery of raised portion 37 being spaced slightly radially outwardly and rearwardly of the rear faces of balls 13 and forwardly of the roller rear face 21. The rear of the coupling stub 34 is suitably upset to form a radially enlarged head 40, shown by broken line, to engage the rear face of raised portion 37 and firmly secure the core member 12 to the raised portion 37 and lock the completed device 10 in assembled condition. The circular raised portion 37 in the locked assembled condition of the device 10 locks the bearing balls 13 against rearward movement from the space 30. The improved device 10 is easy and simple to accurately and uniformly assemble, thereby significantly reducing its cost and assuring its high quality, reliability, ruggedness and long wear life.

While there has been described and illustrated a preferred embodiment of the present invention, it is apparent that numerous alterations, omissions and additions may be made without departing from the spirit thereof.

I claim:

1. A ball bearing roller assembly comprising an inner core member having an inner race defining circular outer peripheral face, an outer roller member of resilient plastic in coaxial registry with said core member and having an outer race defining circular inner peripheral face spaced from said core member outer peripheral face and defining therewith a ball bearing housing annular space, a plurality of ball bearings disposed in said annular space and entrapped between said races, said annular space having a front annular throat of relatively small width less than the diameter of a ball bearing to lock said ball bearings against forward longitudinal movement and a rear throat of relatively greater width less than the diameter of a ball bearing to releasably retain said ball bearings in said annular space by permitting compression of the resilient plastic roller member to release the ball bearings, a support plate having a raised circular section coaxial with and joined to said core member and at least partially covering said rear throat and being proximate to and confronting the rear faces of said ball bearings whereby to lock said ball bearings against longitudinal movement through said rear throat.

2. The ball bearing roller assembly of claim 1 wherein said inner race includes a cylindrical rear section and an arcuate concave front section, and said outer race is of arcuate concave configuration and terminates at its bottom in an inwardly directed resilient annular lip defining with the confronting face of said inner race cylindrical section, said rear throat.

3. The ball bearing assembly of claim 2 wherein said roller member has a rear face and said core member has a rear face disposed forwardly of said roller member rear face substantially in the plane of said lip, said core member rear face overlying the front face of said raised circular section.

4. The ball bearing roller assembly of claim 2 wherein said core member is formed of metal and said plastic roller member is formed of a resilient synthetic organic polymeric resin.

5. The ball bearing assembly of claim 1 wherein said raised circular section has a central opening formed therein and said core member has coaxially formed therewith a rearwardly projecting stub terminating in a radially enlarged rear head engaging the rear face of said raised circular section.

6. The ball bearing roller assembly of claim 1 wherein said roller member includes proximate its front end an inwardly directed annular flange overlying said front throat.

* * * * *